(12) United States Patent
Iijima

(10) Patent No.: US 7,296,289 B2
(45) Date of Patent: Nov. 13, 2007

(54) SETTING OR CHANGING AN ACCESS CONDITION FOR AN ACCESS MANAGEMENT APPARATUS AND METHOD OF A PORTABLE ELECTRONIC DEVICE

(75) Inventor: Yasuo Iijima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/833,174

(22) Filed: Apr. 28, 2004

(65) Prior Publication Data

US 2004/0199788 A1    Oct. 7, 2004

Related U.S. Application Data

(63) Continuation of application No. 09/263,936, filed on Mar. 8, 1999, now abandoned.

(51) Int. Cl.
  *H04L 9/32*    (2006.01)
(52) U.S. Cl. .............................. 726/2; 726/27; 711/205
(58) Field of Classification Search ................ 711/145, 711/151, 158, 205–207, 168; 713/200–201; 707/7, 9–10; 709/206–207, 225, 228–229; 705/75; 726/2–5, 26, 30
See application file for complete search history.

(56) References Cited

U.S. PATENT DOCUMENTS

| | | | |
|---|---|---|---|
| 4,742,215 A | | 5/1988 | Daughters et al. |
| 4,849,614 A | | 7/1989 | Watanabe et al. |
| 4,988,855 A | | 1/1991 | Iijima |
| 5,148,543 A | | 9/1992 | Tamada et al. |
| 5,388,266 A | * | 2/1995 | Frey et al. .................. 711/163 |
| 5,515,532 A | | 5/1996 | Iijima |
| 5,594,910 A | * | 1/1997 | Filepp et al. ................. 712/28 |
| 5,655,096 A | * | 8/1997 | Branigin ..................... 712/200 |

(Continued)

FOREIGN PATENT DOCUMENTS

EP    0 757 336    2/1997

(Continued)

OTHER PUBLICATIONS

Japanese Office Action dated Oct. 11, 2005 for Appln. No. 10-075693

(Continued)

*Primary Examiner*—Hosuk Song
*Assistant Examiner*—Leynna T. Ha
(74) *Attorney, Agent, or Firm*—Pillsbury Winthrop Shaw Pittman, LLP

(57) ABSTRACT

An access management apparatus receives a command message having setting and changing functions, performs corresponding processing, and transmits results. A checking unit checks the presence/absence of a data element to be accessed. Access is permitted based on looking up a setting access condition if the data element is not set and looking up a changing access condition if the data element is set. A control table contains identification information, location information, a data setting access condition, and a data changing access condition of each of a plurality of data elements. When receiving a command, a determining unit determines whether the designated data element is already set by looking up location information of the data element in the control table. A data setting/changing unit sets or changes data in accordance with the access condition looked up.

11 Claims, 13 Drawing Sheets

U.S. PATENT DOCUMENTS

| | | | |
|---|---|---|---|
| 5,694,593 A * | 12/1997 | Baclawski | 707/5 |
| 5,809,244 A * | 9/1998 | Asai et al. | 709/217 |
| 5,822,520 A * | 10/1998 | Parker | 709/230 |
| 5,878,419 A * | 3/1999 | Carter | 707/10 |
| 5,901,303 A | 5/1999 | Chew | |
| 5,948,060 A * | 9/1999 | Gregg et al. | 709/212 |
| 5,950,188 A * | 9/1999 | Wildermuth | 707/3 |
| 5,966,702 A * | 10/1999 | Fresko et al. | 707/1 |
| 6,002,876 A * | 12/1999 | Davis et al. | 717/162 |
| RE36,653 E * | 4/2000 | Heckel et al. | 715/700 |
| 6,052,690 A | 4/2000 | De Jong | |
| 6,058,402 A * | 5/2000 | Feiken | 708/144 |
| 6,091,817 A * | 7/2000 | Bertina et al. | 380/260 |
| 6,101,477 A | 8/2000 | Hohle et al. | |
| 6,296,191 B1 | 10/2001 | Hamann et al. | |
| 6,360,244 B1 | 3/2002 | Bharadhwaj | |
| 6,373,450 B1 * | 4/2002 | Fujita | 345/26 |
| 6,425,001 B2 * | 7/2002 | Lo et al. | 709/217 |
| 6,519,601 B1 * | 2/2003 | Bosch | 707/100 |
| 6,611,861 B1 * | 8/2003 | Schairer et al. | 709/217 |
| 6,633,742 B1 * | 10/2003 | Turner et al. | 434/350 |
| 6,757,710 B2 * | 6/2004 | Reed | 709/203 |

FOREIGN PATENT DOCUMENTS

| | | |
|---|---|---|
| JP | 63-192180 | 8/1988 |
| JP | 04-123265 | 4/1992 |
| JP | 5-100961 | 4/1993 |
| JP | 9-106376 | 4/1997 |
| JP | 9-231113 | 9/1997 |

OTHER PUBLICATIONS

Japanese Office Action for Japanese Patent Application No. 10-075693, dated Sep. 7, 2004.

* cited by examiner

SERIAL NUMBER

| | DFSN | PFSN | FID | |
|---|---|---|---|---|
| #01 | 00 | 00 | 00 | MF DEFINITION INFORMATION |
| #02 | 00 | - | 01 | K00 DEFINITION INFORMATION |
| #03 | 00 | - | 02 | K01 DEFINITION INFORMATION |
| #04 | 00 | - | 03 | D00 DEFINITION INFORMATION |
| #05 | 00 | - | 04 | D01 DEFINITION INFORMATION |
| #06 | 01 | 00 | 11 | DF1 DEFINITION INFORMATION |
| #07 | 01 | - | 01 | K11 DEFINITION INFORMATION |
| #08 | 02 | 00 | 12 | DF2 DEFINITION INFORMATION |
| #09 | 02 | - | 01 | K21 DEFINITION INFORMATION |
| #10 | 01 | - | 02 | K12 DEFINITION INFORMATION |
| #11 | 01 | - | 03 | D11 DEFINITION INFORMATION |
| #12 | 01 | - | 04 | D12 DEFINITION INFORMATION |
| #13 | 03 | 01 | 21 | DF1-1 DEFINITION INFORMATION |
| #14 | 03 | - | 01 | K111 DEFINITION INFORMATION |
| #15 | 03 | - | 02 | K112 DEFINITION INFORMATION |
| #16 | 03 | - | 03 | D111 DEFINITION INFORMATION |
| #17 | 03 | - | 04 | D112 DEFINITION INFORMATION |
| #18 | 04 | 01 | 22 | DF1-2 DEFINITION INFORMATION |
| #19 | 04 | - | 01 | K121 DEFINITION INFORMATION |
| #20 | 04 | - | 02 | K122 DEFINITION INFORMATION |
| #21 | 04 | - | 03 | D121 DEFINITION INFORMATION |
| #22 | 04 | - | 04 | D122 DEFINITION INFORMATION |
| #23 | 02 | - | 02 | K22 DEFINITION INFORMATION |
| #24 | 02 | - | 03 | D21 DEFINITION INFORMATION |
| #25 | 02 | - | 04 | D22 DEFINITION INFORMATION |
| #26 | 05 | 02 | 31 | DF2-1 DEFINITION INFORMATION |
| #27 | 05 | - | 01 | K211 DEFINITION INFORMATION |
| #28 | 05 | - | 02 | K212 DEFINITION INFORMATION |
| #29 | 05 | - | 03 | D211 DEFINITION INFORMATION |
| #30 | 05 | - | 04 | D212 DEFINITION INFORMATION |
| #31 | 06 | 02 | 32 | DF2-2 DEFINITION INFORMATION |
| #32 | 06 | - | 01 | K221 DEFINITION INFORMATION |
| #33 | 06 | - | 02 | K222 DEFINITION INFORMATION |
| #34 | 06 | - | 03 | D221 DEFINITION INFORMATION |
| #35 | 06 | - | 04 | D222 DEFINITION INFORMATION |

FIG. 6

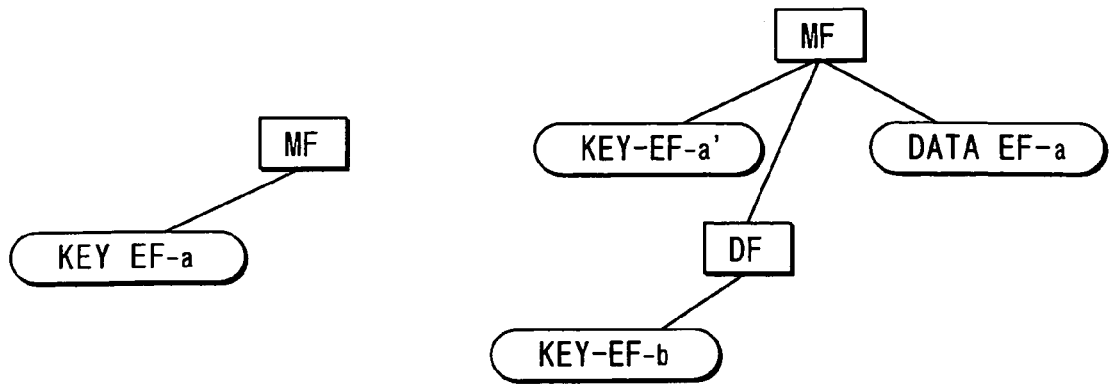
FIG. 14  FIG. 15
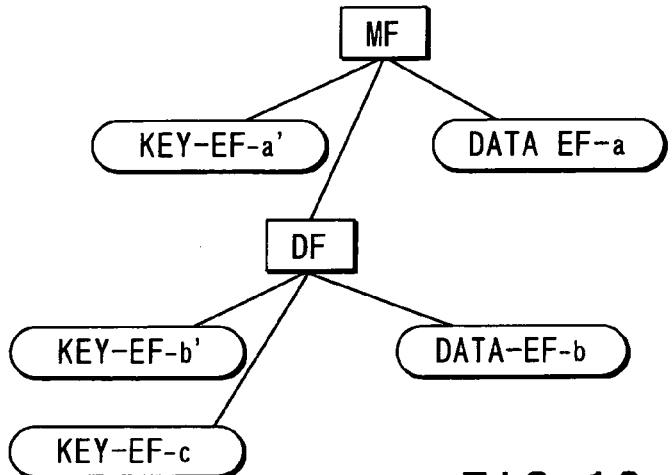
FIG. 16
| TAG | LOCATION · SIZE · VARIABLE/FIXED | READ CONDITION | WRITE CONDITION | REWRITE CONDITION |
|---|---|---|---|---|
| 01 | ADR01 · SIZE01 · VARIABLE | A, B, C | A, B | B |
| 02 | ADR02 · SIZE02 · FIXED | A, C | A | P |
| 03 | ADR03 · SIZE03 · FIXED | F | A, C | C |
FIG. 17

SETTING OR CHANGING AN ACCESS CONDITION FOR AN ACCESS MANAGEMENT APPARATUS AND METHOD OF A PORTABLE ELECTRONIC DEVICE

CROSS-REFERENCE TO RELATED APPLICATIONS

This is a Continuation Application of U.S. application Ser. No. 09/263,936, filed Mar. 8, 1999, now abandoned, which is based upon and claims the benefit of priority from the prior Japanese Patent Application No. 10-075693, filed Mar. 24, 1998.

BACKGROUND OF THE INVENTION

The present invention relates to an access management method and apparatus by which an electronic device such as an IC card incorporating an IC chip having a nonvolatile memory and a control device such as a CPU receives a command massage having both setting and changing functions, performs corresponding processing, and transmits the result to an external apparatus, and a portable electronic device used therefor.

Recently, an IC card incorporating an IC chip having a nonvolatile data memory and a control device such as a CPU (Central Processing Unit) for controlling the memory has attracted attention as a portable data storage medium as a kind of portable electronic device.

In an IC card of this sort, an internal data memory is divided into a plurality of files, and each file stores data and the like required by an application to operate. When an application identification name or the like is input from an external apparatus, only a corresponding file is selectively made usable.

Since a plurality of application data are divided into files and stored in one IC card, the card can be used for various purposes.

This multi-purpose IC card is required to clearly distinguish between the authorization of a card issuer and that of an application provider.

This authorization can be realized by clearly determining a permitted range of access to an IC card when a password assigned to each party concerned is collated.

When a card issuer of a conventional IC card provides a file to an application provider, a transport key for the application provider is set in the file.

The application provider receives the card and rewrites the transport key to a provider key that this provider alone can know. After that, the application provider can manage the file provided to the provider.

A general example of information for defining an environment in which a file can be managed is an access condition given to the file.

That is, a file that a card issuer provides to an application provider must be given an access condition requiring collation of an application provider key.

When conventional data element commands are used, data element setting access and data element changing access are performed by the same command.

If, therefore, access permission is determined only on the basis of the access condition of each command, the setting and changing access conditions become the same.

As described above, when conventional data element commands are used, data element setting access and data element changing access are performed by the same command. Hence, if access permission is determined only on the basis of the access condition of each command, the setting and changing access conditions become the same.

BRIEF SUMMARY OF THE INVENTION

The present invention has been made in consideration of the above situation, and has as its object to provide an access management method and apparatus by which when a command having both setting and changing functions is input, the presence/absence of a data element to be accessed is checked, and whether access of the command is to be permitted is determined by looking up a setting access condition if the data element is not set and looking up a changing access condition if the data element is set, thereby preventing the setting and changing access conditions from becoming the same, and to provide a portable electronic device for use in the method and apparatus.

To achieve the above object, according to one aspect of the present invention, there is provided an access management method of receiving a command message having both setting and changing functions, performing corresponding processing, and transmitting the result to an external apparatus, comprising the steps of:

checking the presence/absence of a data element to be accessed when receiving the command message having both setting and changing functions; and determining whether access is to be permitted by looking up a setting access condition if the data element is not set and looking up a changing access condition if the data element is set.

To achieve the above object, according to another aspect of the present invention, there is provided an access management apparatus for receiving a command message having both setting and changing functions, performing corresponding processing, and transmitting the result to an external apparatus, comprising:

checking means for checking the presence/absence of a data element to be accessed when receiving the command message having both setting and changing functions; and determining means for determining whether access is to be permitted by looking up a setting access condition if the data element is not set and looking up a changing access condition if the data element is set.

To achieve the above object of the present invention, according to still another aspect of the present invention, there is provided a portable electronic device for receiving a command from an external apparatus and performing corresponding processing, comprising:

a memory storing a control table containing identification information, location information, a data setting access condition, and a data changing access condition of each of a plurality of data elements;

determining means for determining, when receiving a command including identification information of a data element from an external apparatus, whether the designated data element is already set by looking up location information of the data element in the control table;

first look-up means for looking up a data setting access condition in the control table if the determining means determines that the data element is not set;

second look-up means for looking up a data changing access condition in the control table if the determining means determines that the data element is already set; and means for setting or changing data in accordance with the access condition looked up by the first or second look-up means.

To achieve the above object, according to still another aspect of the present invention, there is provided a portable electronic device for receiving a command from an external apparatus and performing corresponding processing, comprising:

a memory storing a control table containing identification information, location information, allowable length information, and discrimination information, which discriminates whether the allowable length information is fixed length information or a maximum length, of each of a plurality of data elements;

size determining means for, when receiving a command including identification information and setting data of a data element from an external apparatus, looking up allowable length information of the data element and discrimination information for discriminating whether the allowable length information is fixed length information or a maximum length, and determining whether a length of the received data element equals the fixed length information if the allowable length information is the fixed length information or determining whether the length of the received data element is not more than the maximum length if the allowable length information is the maximum length; and means for setting the data if the size determining means determines that a size of the received data is a suitable size.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a view showing the arrangement of directories set in the data memory;

FIG. 14 is a view for explaining file creation performed for the IC card by an IC card manufacturer;

FIG. 15 is a view for explaining file creation performed for the IC card by an IC card issuer;

FIG. 16 is a view for explaining file creation performed for the IC card by an application provider;

FIG. 17 is a view showing a data element control table used to process a PUT command;

DETAILED DESCRIPTION OF THE INVENTION

Figure 1:
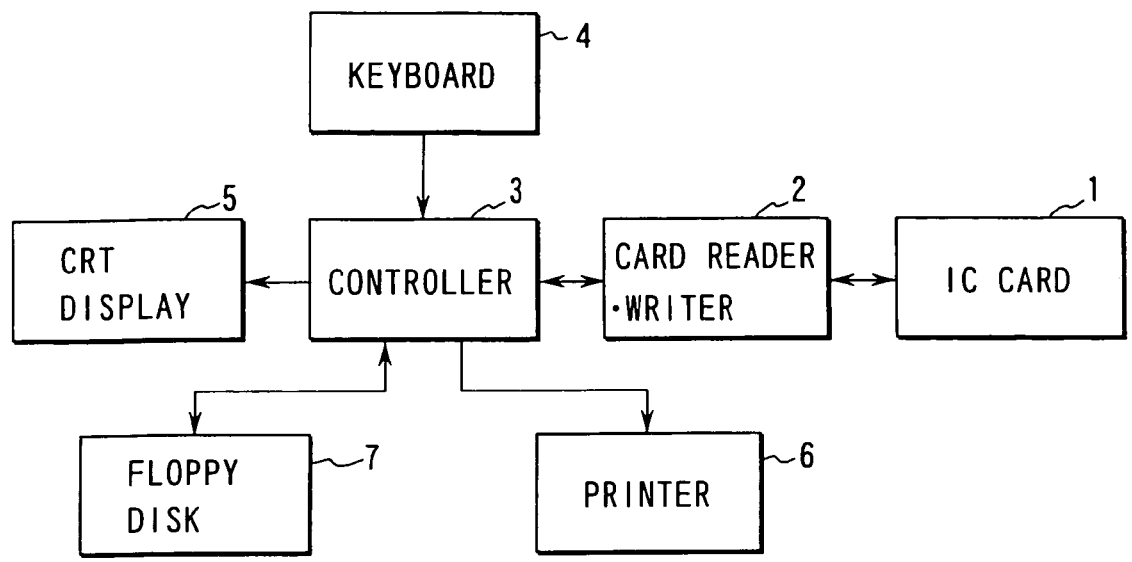
FIG. 1 is a block diagram showing the basic arrangement of a card processor to which an IC card as a portable electronic device according to an embodiment of the present invention is applied.

Reference will now be made in detail to the presently preferred embodiments of the invention as illustrated in the accompanying drawings, in which like reference characters designate like or corresponding parts throughout the several drawings.

An embodiment of the present invention will be described in detail below with reference to the accompanying drawings.

FIG. 1 shows the basic arrangement of a card processor to which an IC card as a portable electronic device according to this embodiment is applied. This card processor is used as a terminal in, e.g., a banking system or a shopping system.

The card processor can connect an IC card 1 to a controller 3 including a CPU and the like via a card reader.writer 2. The controller 3 is connected to a keyboard 4, a CRT display 5, a printer 6, and a floppy disk unit 7.

Figure 2:
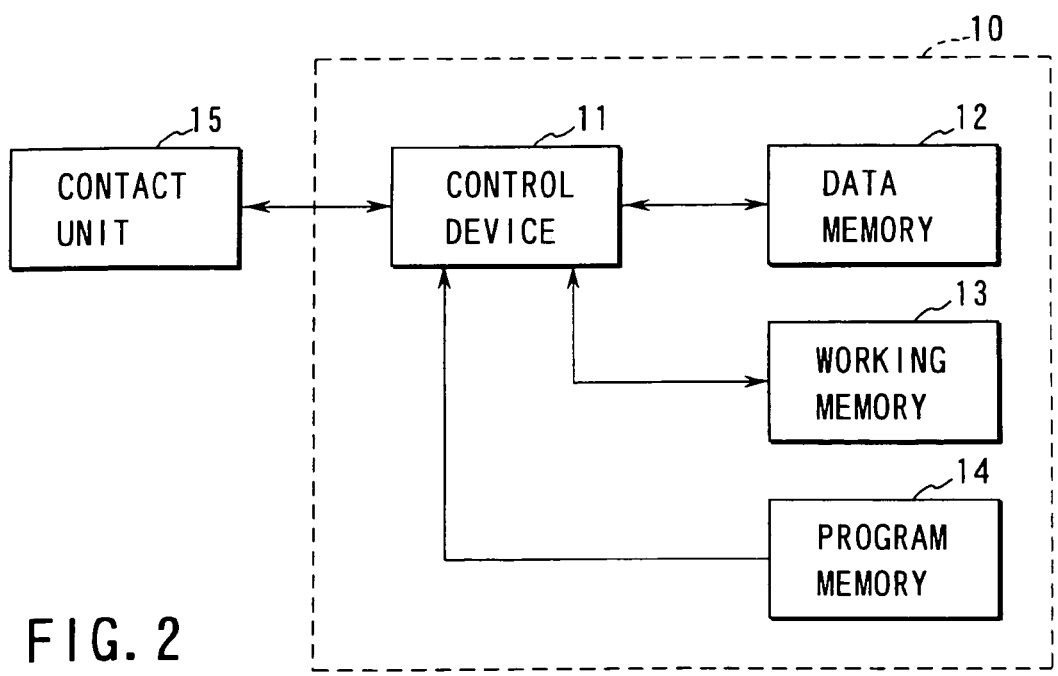
FIG. 2 is a block diagram showing the basic arrangement of the IC card.

FIG. 2 shows the basic arrangement of the IC card 1.

This IC card 1 includes a control device (e.g., a CPU) 11 as a controller, a nonvolatile data memory 12 whose stored contents are erasable, a working memory 13, a program memory 14, and a contact unit 15 for obtaining an electrical contact with the card reader-writer 2.

The units (the control device 11, the data memory 12, the working memory 13, and the program memory 14) enclosed by the broken lines are constructed by one (or a plurality of) IC chip 10. Additionally, as disclosed in Jpn. UM Appln. KOKAI Publication No. 2-17381, the IC chip 10 and the contact unit 15 are embedded as an integrated IC module in the IC card main body.

The data memory 12 is, e.g., an EEPROM and used to store various data.

The working memory 13 is, e.g., a RAM and used to temporarily hold processing data when the control device 11 performs processing.

The program memory 14 is, e.g., a mask ROM and used to store programs and the like of the control device 11.

Figure 3:
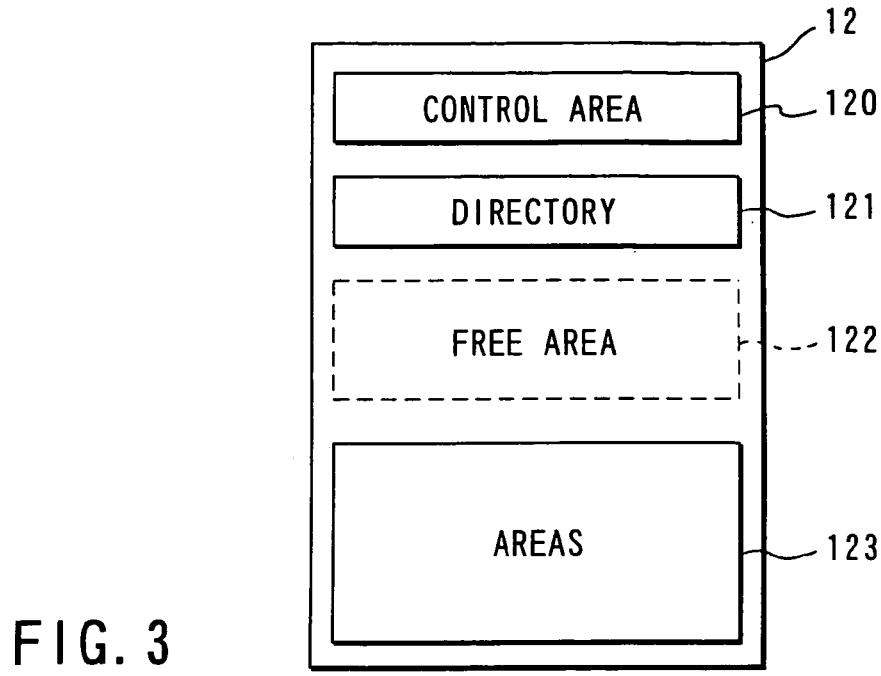
FIG. 3 is a memory map showing the arrangement of a data memory.

As shown in FIG. 3, the data memory 12 is divided into a control area 120, a directory 121, a free area 122, and areas 123.

The areas 123 include data areas and key areas and can be grouped in accordance with a concept called a data file (DF).

Note that a master file (MF) to be described later is managed as one data file form.

A data file (DF) is used to collectively manage data areas and key areas to be used by a corresponding application.

A data area stores data such as transaction data to be read out or written where necessary.

A key area stores, e.g., a password. Data in this area can be written/rewritten/collated but cannot be read out.

As shown in FIG. 3, these areas are collectively allocated as the areas 123.

The control device 11 detects the physical positions and the like of these files or areas by using the directory 121 in the data memory 12.

The control area 120 shown in FIG. 3 stores start address information of the areas 123 and start address information of the free area 122.

The directory 121 shown in FIG. 3 stores various kinds of definition information corresponding to the data files and areas as shown in FIGS. 4A to 4D.

Figure 4A:
FIGS. 4A to 4D are views showing the formats of various kinds of definition information.

That is, FIG. 4A shows information defining a data file name.

This definition information contains data PTN for identifying data file name definition information in the directory 121, a file serial number DFSN assigned to this data file, a serial number PFSN of a parent file of this data file, a file name DFname given to this data file, data NL indicating the length of the name, and data BCC for checking the validities of these data.

Figure 4B:
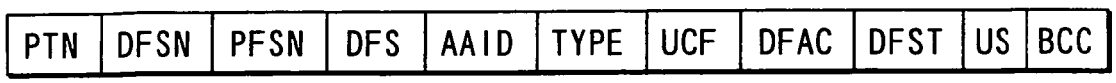

FIG. 4B shows information defining data file management information.

This definition information contains data PTN for identifying data file name definition information in the directory 121, a file serial number DFSN assigned to this data file, a serial number PFSN of a parent file of this data file, a data file size DFS, AAID for identifying a data area for storing additional information of this data file, TYPE for determining whether the additional information is to be output, UCF for inhibiting key type, DFAC indicating a data file access condition, DFST for holding the status of this data file, US indicating the number of bytes used by data files and areas under this data file, and data BCC for checking the validities of these data.

A specific bit (e.g., the eighth bit) of the DFST is used as a transport bit indicating whether the transport key of this DF is changed.

Especially when a data file is selected by a data file selection command (to be described later), the AAID outputs the contents of a data area indicated by the data file where necessary.

Figure 4C:

FIG. 4C shows information defining an area for storing various transaction data and the like.

This definition information contains data PTN for identifying area definition information in the directory 121, a serial number DFSN of a data file to which this area belongs, an identification number AID used to access the area, ATOP indicating the start address of the area, ASIZ indicating an area size, AAC indicating an area access condition, AST for holding the state of the area, and data BCC for checking the validities of these data.

Figure 4D:

FIG. 4D shows information defining an area for storing various key data.

This definition information contains data PTN for identifying area definition information in the directory 121, a serial number DFSN of a data file to which this area belongs, an identification number KID used to access the area, KTOP indicating the start address of the area, KSIZ indicating an area size, CF indicating the type of key, KAC indicating an area access condition, KST for holding the status of the area, and data BCC for checking the validities of these data.

The identification information PTN used in these pieces of information is composed of, e.g., 1 byte; i.e., '00' is used to define the name of a data file (FIG. 4A), '01' is used to define the management information of a data file (FIG. 4B), '02' is used to define a data area, and '03' is used to define a key area (FIG. 4D).

Figure 5:
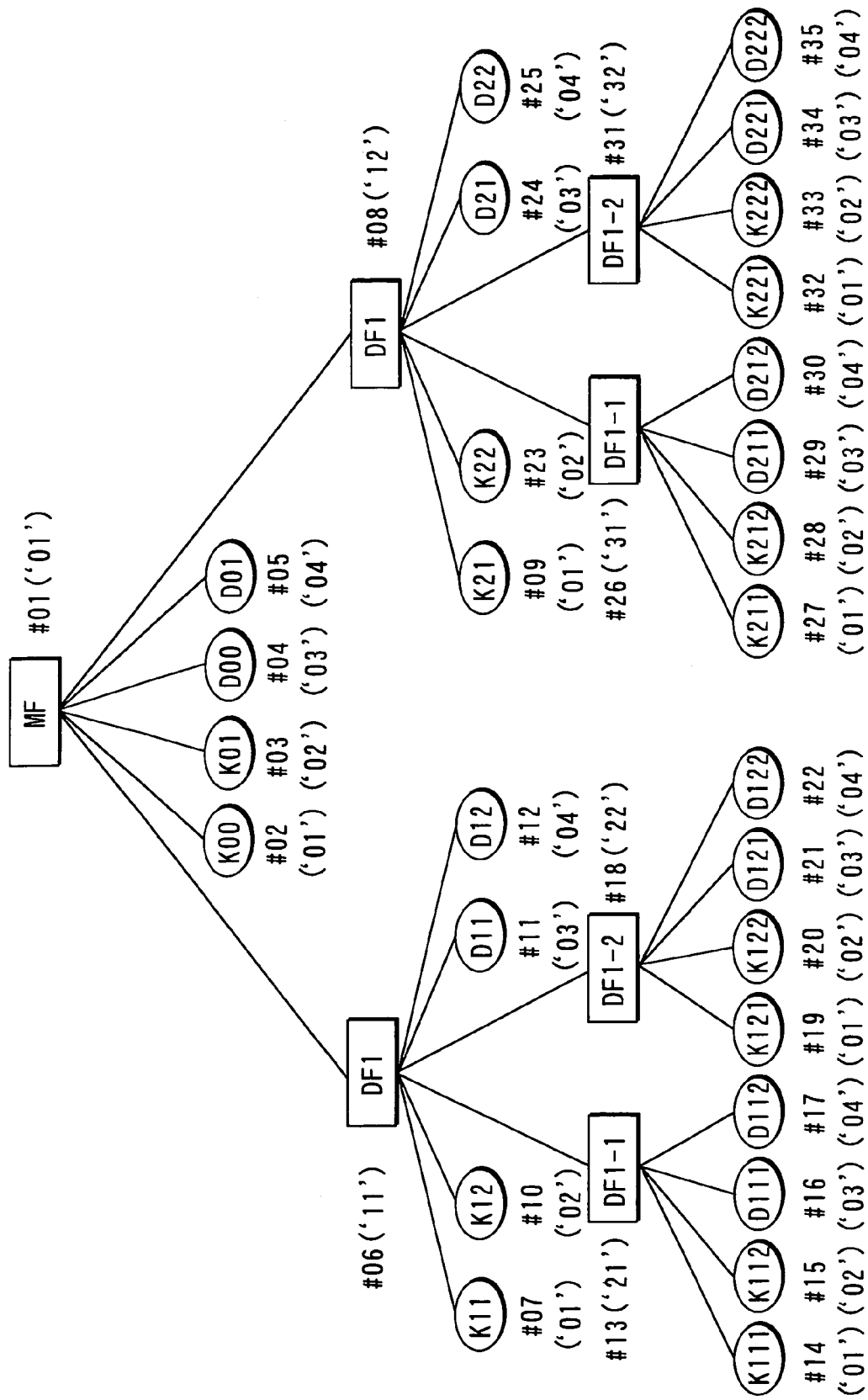
FIG. 5 is a view showing the structure of files set in the data memory.

FIG. 5 shows the structure of a file.

In FIG. 5, reference symbols DFnn, Dnn, and Knn denote a data file, a data area, and a key area, respectively.

As shown in FIG. .5, in the internal memory 12 of the IC card 1, data files DF1 and DF2, key areas K00 and K01, and data areas D00 and D01 are set under a master file (MF).

Data files DF1-1 and DF1-2, key areas K11 and K12, and data areas D11 and D12 are set under the data file DF1.

Key areas K111 and K112 and data areas D111 and D112 are set under the data file DF1-1. Key areas K121 and K122 and data areas D121 and D122 are set under the data file DF1-2.

Data files DF2-1 and DF2-2, key areas K21 and K22, and data areas D21 and D22 are set under the data file DF2.

Key areas K211 and K212 and data areas D211 and D212 are set under the data file DF2-1. Key areas K221 and K222 and data areas D221 and D222 are set under the data file DF2-2.

As shown in FIG. 6, these various kinds of information are collectively stored in the directory 121.

Referring to FIG. 6, each definition information is automatically given a DFSN (file serial number) when the file is created.

The control device 11 detects the relations between files on the basis of this DFSN and the sequence number of a parent file stored in data file definition information.

For example, the definition information (serial number #13) of the data file DF1-1 contains a DFSN '03' and a PFSN '01'.

That is, the control device 11 detects that this data file is given a file sequence number '03' when created under DF1, and gives the DFSN ('01') of the data file DF1 as the PFSN.

Figure 7:
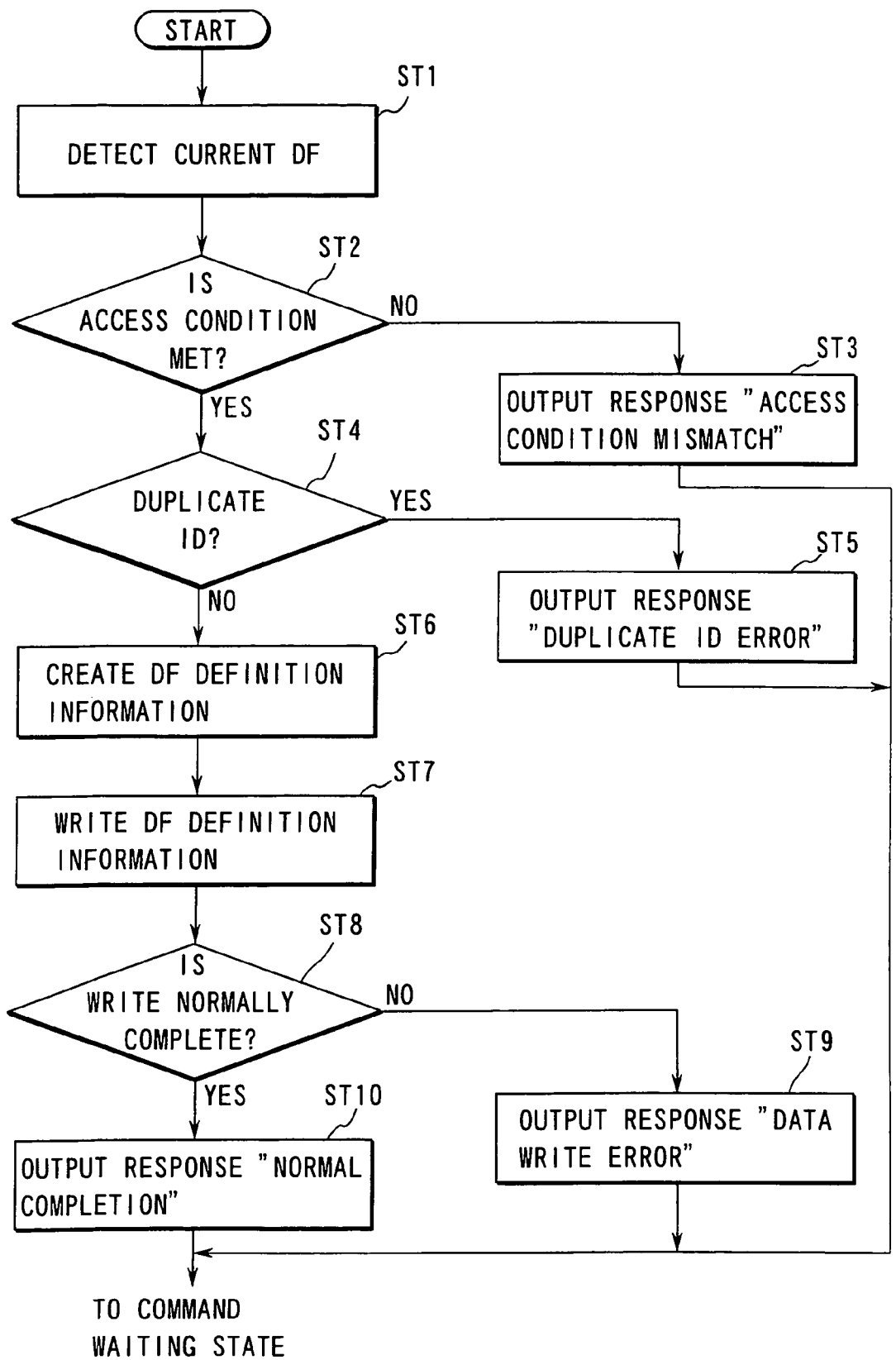
FIG. 7 is a flow chart for explaining an operation of creating a data file.

FIG. 7 is a flow chart for explaining an operation of creating a data file (DF). This operation will be described below.

When the IC card 1 receives an externally input data file creation command, the control device 11 detects a data file in a usable state, i.e., a current state (this data file will be referred to as a current DF hereinafter) (ST1).

This current DF is a master file (MF) immediately after the IC card 1 is electrically activated.

After detecting the current DF, the control device 11 looks up information pertaining to file creation as one access condition information in current DF definition information.

The control device 11 compares this access condition information with only a collation holding area A on a RAM (to be described later) and checks whether key collation required by the access condition is established (ST2).

If this key collation is not established, the control device 11 outputs a response message indicating "access condition mismatch" and returns the IC card 1 to a command waiting state (ST3).

If the key collation is established, the control device 11 extracts the file name (DF-ID) of a data file set in the command and checks whether there exists data file definition information having the same value as the FSN of the current DF as a parent FSN and the same file name as the extracted file name (ST4).

If this data file definition information exists, the control device 11 outputs a response message indicating "duplicate ID error" and returns the IC card 1 to the command waiting state (ST5).

If no such definition information exists, the control device 11 creates the data file definition information shown in FIGS. 4A to 4C on the basis of data file creation data given by the command (ST6) and writes the information in a predetermined area (ST7).

If this write is not normally complete (ST8), the control device 11 outputs a response message indicating "data write error" and returns the IC card 1 to the command waiting state (ST9).

If the write is normally complete (ST8), the control device 11 outputs a response message indicating "normal completion" and returns the IC card 1 to the command waiting state (ST10).

Figure 8:
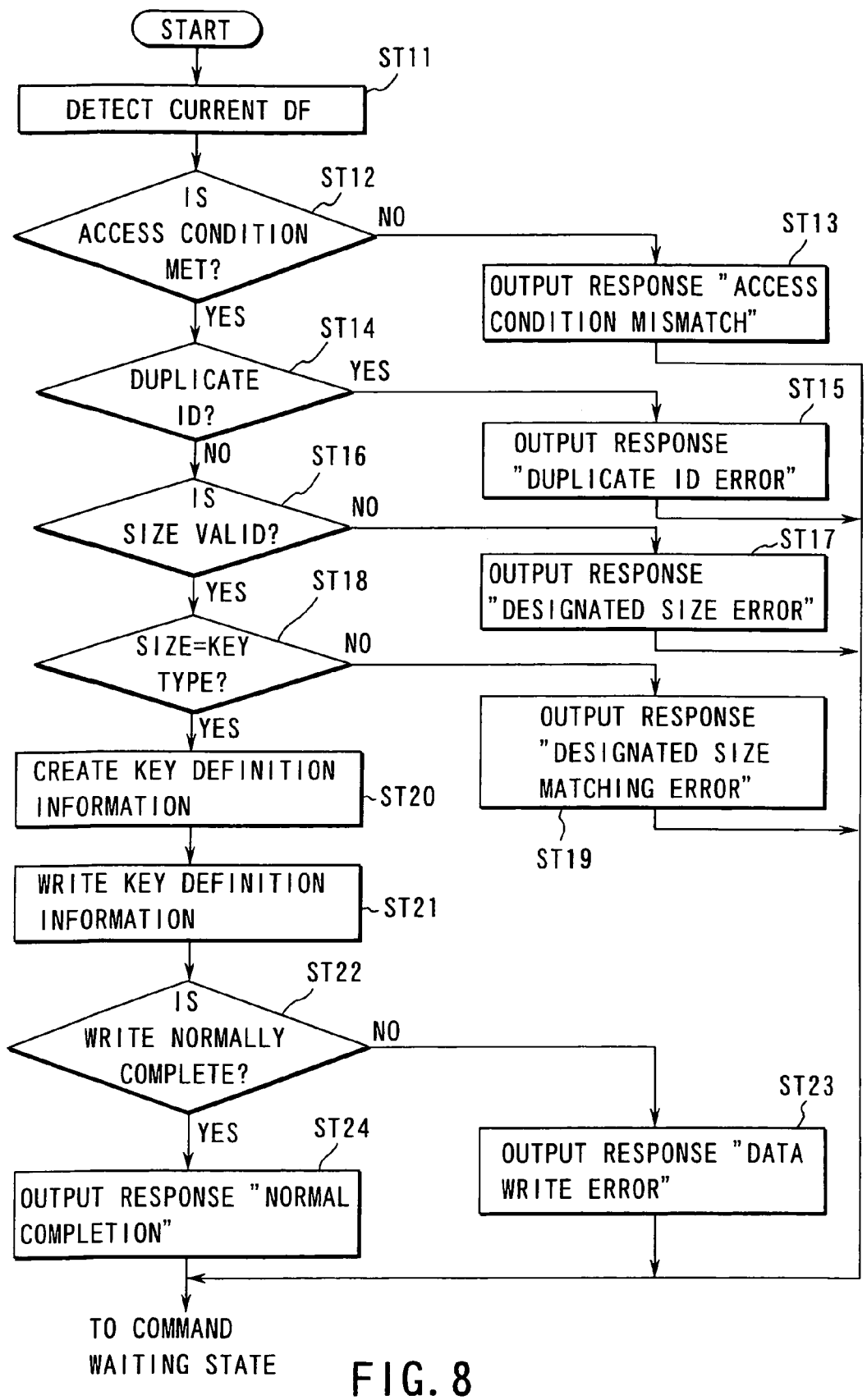
FIG. 8 is a flow chart for explaining an operation of creating a key elementary file.

FIG. 8 is a flow chart for explaining an operation of creating a key elementary file (EF). This operation will be described below.

When the IC card 1 receives an externally input key EF creation command, the control device 11 detects a current DF (ST11).

After detecting the current DF, the control device 11 looks up information pertaining to file creation as one access condition information in current DF definition information.

The control device 11 compares this condition with only the collation holding area A on the RAM (to be described later) and checks whether key collation required by the access condition is established (ST12).

If this collation is not established, the control device 11 outputs a response message indicating "access condition mismatch" and returns the IC card 1 to the command waiting state (ST13).

If the collation is established, the control device 11 looks up an elementary file name (EF-ID) designated by the command message and checks whether this elementary file name exists in the current DF to be accessed (ST14).

If this elementary file name exists, the control device 11 outputs a response message indicating "duplicate ID error" and returns the IC card 1 to the command waiting state (ST15).

If the elementary file name does not exist, the control device 11 compares the size data of the key EF designated by the command message with the free area size in the current DF to be accessed (ST16).

In this comparison, the control device 11 checks whether the free area size is larger than the sum of the size of the designated key EF and the size of directory information used when this key EF is created.

If the former size is larger than the latter size, the control device 11 outputs a response message indicating "designated size error" and returns the IC card to the command waiting state (ST17).

If not, the control device 11 checks the type of key designated by the command message and the validity of the size (ST18).

If the key type represents "authentication relevant key", a size of, e.g., 10 bytes is valid. If the key type represents "collation key", a size of, e.g., 3 to 18 bytes is valid.

If the size is invalid, the control device 11 outputs a response message indicating "designated size matching error" and returns the IC card 1 to the command waiting state (ST19).

If the size is valid, the control device 11 creates key EF definition information to be stored in the directory on the basis of the received command (ST20) and writes the information in a predetermined area (ST21).

The value of the eighth bit of status information is determined in accordance with the first bit of the key type information designated by the command message.

That is, the same value as the latter bit value is set in the former bit.

The eighth bit of this status information indicates whether the key data is changed. If this bit is "1", the key data is not changed; if the bit is "0", the key data has been changed.

Accordingly, if the first bit of the key type information is "1", the eighth bit of the status information is "0" only when the key data is changed. If the first bit of the key type information is "0", the eighth bit of the status information is "0" regardless of whether the key data is to be changed (i.e., this equivalently indicates that the data is implicitly rewritten).

If the write of the key EF definition information is not normally complete (ST22), the control device 11 outputs a response message indicating "data write error" and returns the IC card 1 to the command waiting state (ST23).

If the write is normally complete (ST22), the control device 11 outputs a response message indicating "normal completion" and returns the IC card 1 to the waiting state (ST24).

Figure 9:
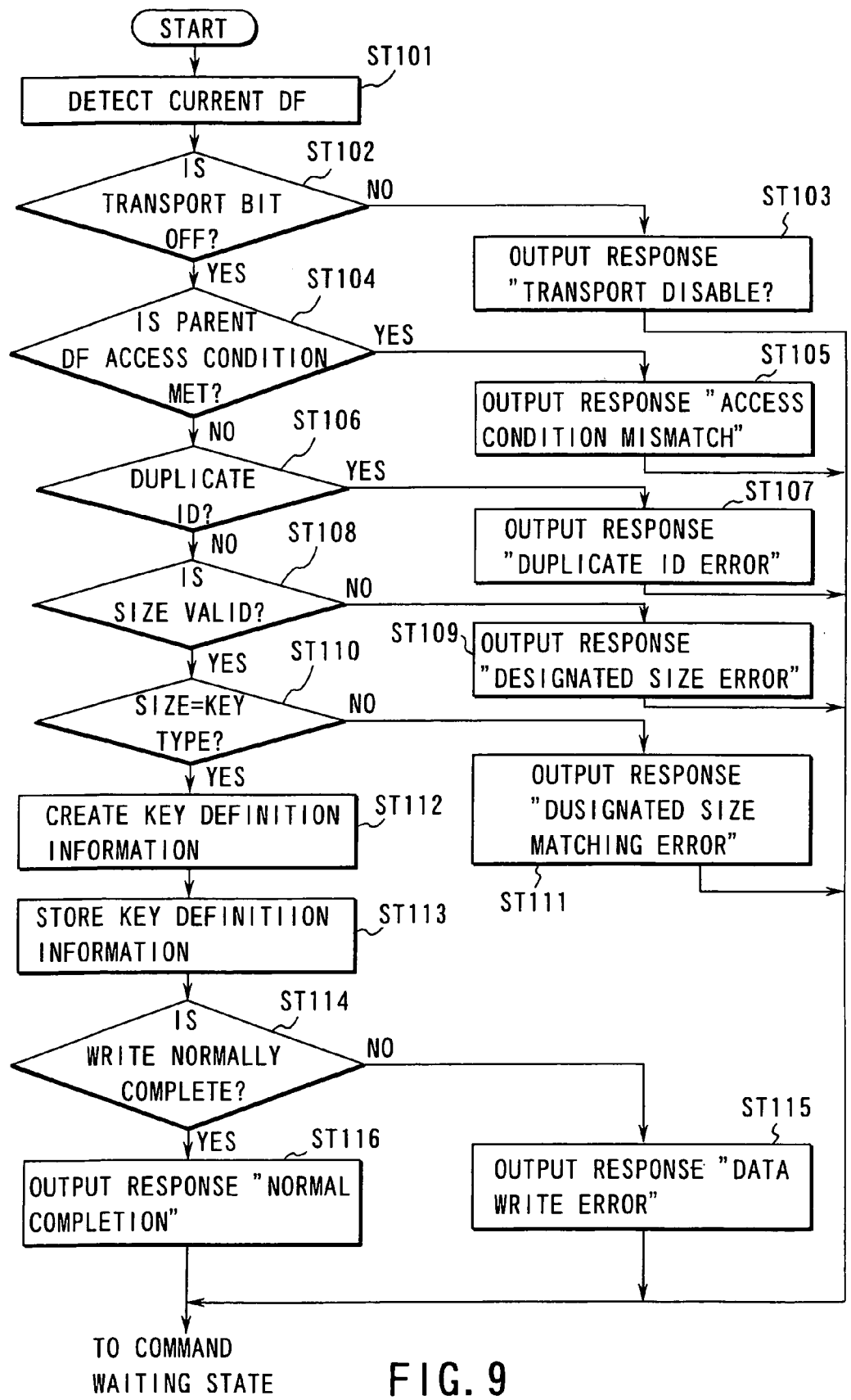
FIG. 9 is a flow chart for explaining an operation of creating a transport key elementary file.

FIG. 9 is a flow chart for explaining an operation of creating a transport key elementary file TKEF. This operation will be described below.

When the IC card 1 receives an externally input TKEF creation command, the control device 11 detects a current DF (ST101).

After detecting the current DF, the control device 11 checks whether a transport bit in status information DFST set in this data file (DF) is ON (ST102).

If the transport bit is ON, the control device 11 rejects the command, outputs a response message indicating "transport disable" and returns the IC card 1 to the command waiting state (ST103).

If the transport bit is OFF, the control device 11 accepts this TKEF creation command.

Note that this transport bit is OFF when a data file is created and turned on when the transport key itself is changed by a key change command.

After accepting the TKEF creation command, the control device 11 looks up the access condition of a parent data file (DF) of this current DF.

The control device 11 compares this condition with only the collation holding area A on the RAM (to be described later) and checks whether key collation required by the access condition is established (ST104).

If this collation is not established, the control device 11 outputs a response message indicating "access condition mismatch" and returns the IC card 1 to the command waiting state (ST105).

If the collation is established, the control device 11 looks up an elementary file name (EF-ID) designated by the command message and checks whether the elementary file name exists in the current DF to be accessed (ST106).

If this elementary file name exists, the control device 11 outputs a response message indicating "duplicate ID error" and returns the IC card 1 to the command waiting state (ST107).

If the elementary file name does not exist, the control device 11 compares the size data of the key EF designated by the command message with the free area size in the current DF to be accessed (ST108).

In this comparison, the control device 11 checks whether the free area size is larger than the sum of the size of the designated key EF and the size of directory information used when this key EF is created.

If the former size is larger than the latter size, the control device 11 outputs a response message indicating "designated size error" and returns the IC card to the command waiting state (ST109).

If not, the control device 11 checks the type of key designated by the command message and the validity of the size (ST110).

If the key type represents "authentication relevant key", a size of, e.g., 10 bytes is valid. If the key type represents "collation key", a size of, e.g., 3 to 18 bytes is valid.

If the size is invalid, the control device 11 outputs a response message indicating "designated size matching error" and returns the IC card 1 to the command waiting state (ST111).

If the size is valid, the control device 11 creates key EF definition information to be stored in the directory on the basis of the received command (ST112) and writes the information in a predetermined area (ST113).

The value of the eighth bit of status information is determined in accordance with the first bit of the key type information designated by the command message.

That is, the same value as the latter bit value is set in the former bit.

The eighth bit of this status information indicates whether the key data is changed. If this bit is "1", the key data is not changed; if the bit is "0", the key data has been changed.

Accordingly, if the first bit of the key type information is "1", the eighth bit of the status information is "0" only when the key data is changed. If the first bit of the key type information is "0", the eighth bit of the status information is "0" regardless of whether the key data is changed (i.e., this equivalently indicates that the data is implicitly rewritten).

If the write of the key EF definition information is not normally complete (ST114), the control device 11 outputs a response message indicating "data write error" and returns the IC card 1 to the command waiting state (ST115).

If the write is normally complete (ST114), the control device 11 outputs a response message indicating "normal completion" and returns the IC card 1 to the waiting state (ST116).

Figure 10:
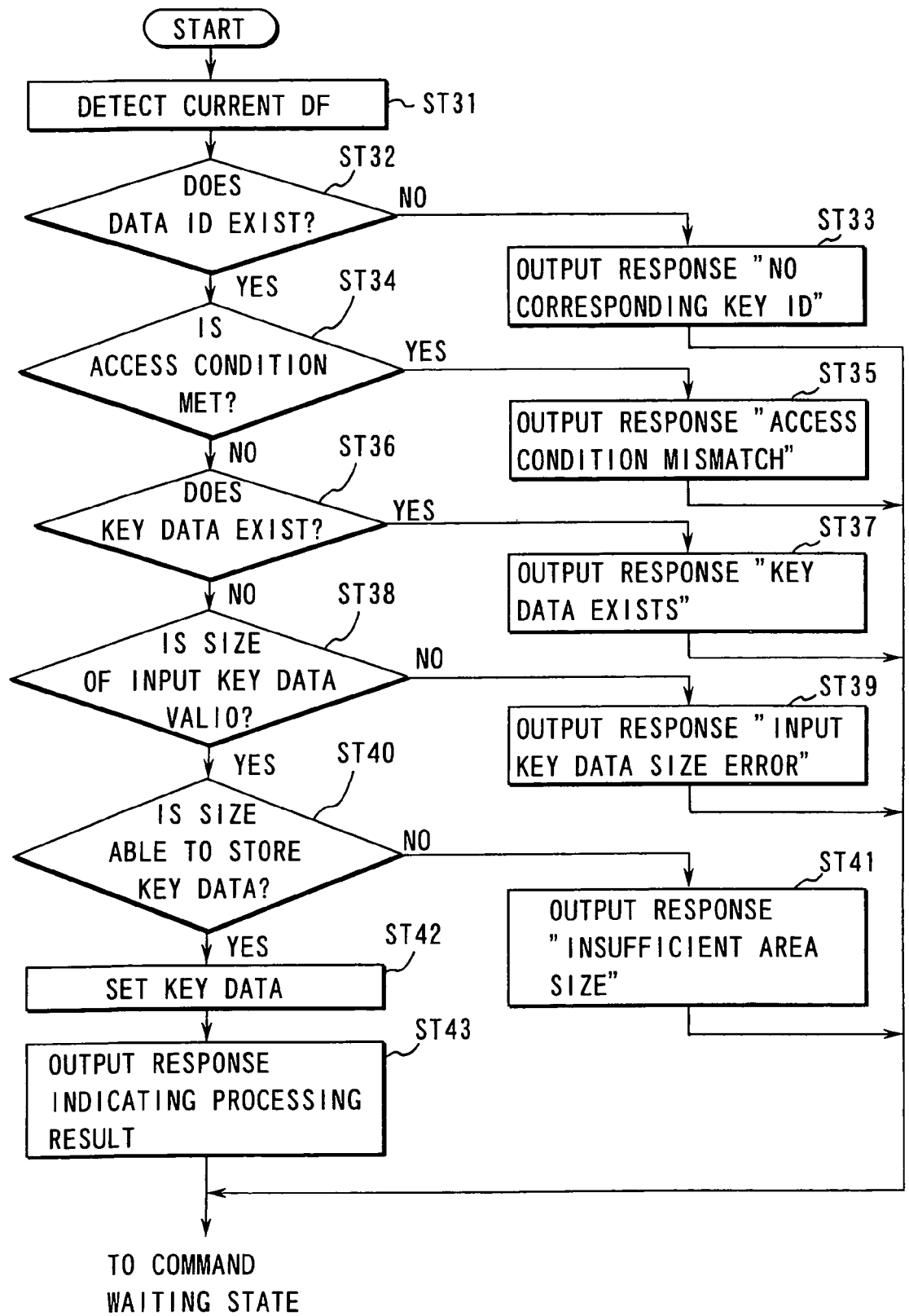
FIG. 10 is a flow chart for explaining an operation of setting key data.

FIG. 10 is a flow chart for explaining an operation of setting key data. This operation will be described below.

When the IC card 1 receives an externally input key data set command, the control device 11 detects a current DF (ST31).

After detecting the current DF, the control device 11 looks up an elementary file name (EF-ID) designated by the command message and checks whether the elementary file name exists in the current DF to be accessed (ST32).

If this file name does not exist, the control device 11 outputs a response message indicating "no corresponding key ID" and returns the IC card 1 to the command waiting state (ST33).

If the file name exists, the control device 11 looks up information pertaining to key data setting as one access condition information in this key EF definition information.

The control device 11 compares this condition with only the collation holding area A on the RAM (to be described later) and checks whether key collation required by the access condition is established (ST34).

If this collation is not established, the control device 11 outputs a response message indicating "access condition mismatch" and returns the IC card 1 to the command waiting state (ST35).

If the collation is established, the control device 11 checks whether key data exists in a corresponding key EF area (ST36).

If key data exists in this area, the control device 11 outputs a response message indicating "key data exists" and returns the IC card 1 to the waiting state (ST37).

If no key data exists in the area, the control device 11 checks the type of key designated by the command message and the validity of the size of the input key data (ST38).

If the key type represents "authentication relevant key", a size of, e.g., 8 bytes is valid. If the key type represents "collation key", a size of, e.g., 1 to 16 bytes is valid.

If the size is invalid, the control device 11 outputs a response message indicating "input key data size error" and returns the IC card 1 to the command waiting state (ST39).

If the size is valid, the control device 11 compares the size defined in the key definition information with the size of the input key data (ST40).

If the sum of the latter size and, e.g., "2" is larger than the former size, the control device 11 outputs a response message indicating "insufficient area size" and returns the IC card 1 to the command waiting state (ST41).

If not, the control device 11 adds 1-byte information and 1-byte BBC to the key data input by the received command and stores the resulting data in the corresponding key EF area (ST42). The control device 11 outputs a response message indicating the processing result and returns the IC card 1 to the command waiting state (ST43).

Figure 11:
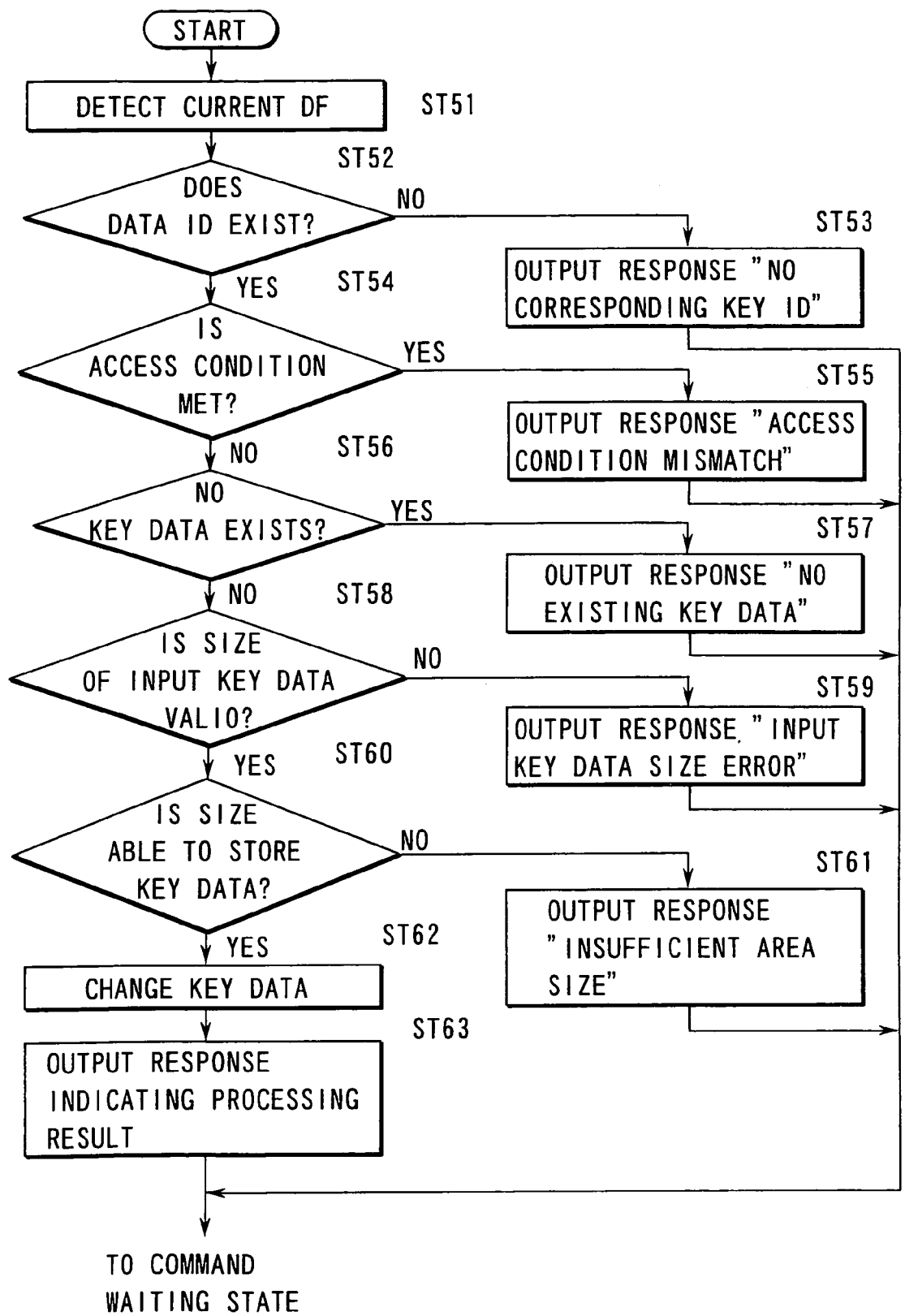
FIG. 11 is a flow chart for explaining an operation of changing key data.

FIG. 11 is a flow chart for explaining an operation of changing key data. This operation will be described below.

When the IC card 1 receives an externally input key data change command, the control device 11 detects a current DF (ST51).

After detecting the current DF, the control device 11 looks up an elementary file name (EF-ID) designated by the command message and checks whether this elementary file name exists in the current DF to be accessed (ST52).

If this EF does not exist, the control device 11 outputs a response message indicating "no corresponding key ID" and returns the IC card 1 to the command waiting state (ST53).

If the EF exists, the control device 11 looks up information pertaining to key data change as one access condition information in this key EF definition information.

The control device 11 compares this condition with the collation holding area A and a collation holding area B on the RAM (to be described later) and checks whether key collation required by the access condition is established (ST54).

If this collation is not established, the control device 11 outputs a response message indicating "access condition mismatch" and returns the IC card 1 to the command waiting state (ST55).

If the collation is established, the control device 11 checks whether key data exists in a corresponding key EF area (ST56).

If no key data exists in this area, the control device 11 outputs a response message indicating "no existing key data" and returns the IC card 1 to the command waiting state (ST57).

If key data exists in the area, the control device 11 checks the type of key designated by the command message and the validity of the size of the input key data (ST58).

If the key type represents "authentication relevant key", a size of, e.g., 8 bytes is valid. If the key type represents "collation key", a size of, e.g., 1 to 16 bytes is valid.

If the size is invalid, the control device 11 outputs a response message indicating "input key data size error" and returns the IC card 1 to the command waiting state (ST59).

If the size is valid, the control device 11 compares the size defined in the key definition information with the size of the input key data (ST60).

If the sum of the latter size and, e.g., "2" is larger than the former size, the control device 11 outputs a response message indicating "insufficient area size" and returns the IC card 1 to the command waiting state (ST61).

If not, the control device 11 adds 1-byte information and 1-byte BBC to the key data input by the received command and stores the resulting data in the corresponding key EF area (ST62). The control device 11 outputs a response message indicating the processing result and returns the IC card 1 to the command waiting state (ST63).

At the same time, the control device 11 sets "0" in the eighth bit of status information in the key EF definition information.

Figure 12:
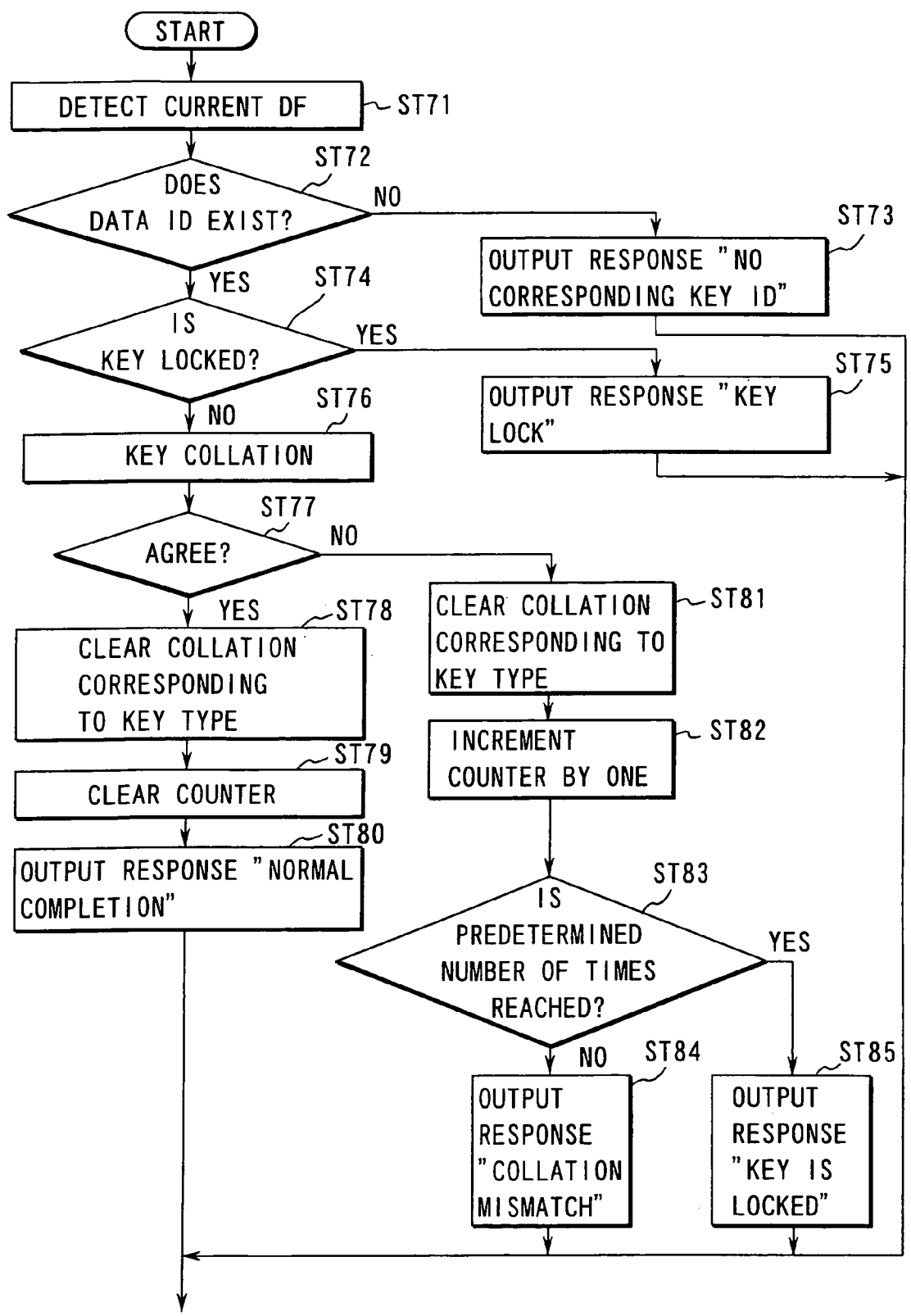
FIG. 12 is a flow chart for explaining an operation of collating a key.

FIG. 12 is a flow chart for explaining a key collating operation. This operation will be described below.

When the IC card 1 receives an externally input key collating command, the control device 11 detects a current DF (ST71).

After detecting the current DF, the control device 11 searches the directory 121 and checks whether key EF definition information having the designated file name (ID) exists in the current DF (ST72).

If no such key EF definition information exists, the control device 11 outputs a response message indicating "no corresponding key ID" and returns the IC card 1 to the command waiting state (ST73).

If this key EF definition information exists, the control device 11 checks whether the key is locked (ST74).

If the key is locked, the control device 11 outputs a response message indicating "key lock" and returns the IC card 1 to the command waiting state (ST75).

If not, the control device 11 collates key data in the command message with key data stored in the key EF (ST76).

If the two key data agree (ST77), the control device 11 looks up collating bit designation information in the key EF definition information to set "1" in a bit position designated by the information in a predetermined RAM area (ST78).

Next, the control device 11 clears a key inherent collation mismatch counter in the key EF definition information (ST79). Also, the control device 11 outputs a response message indicating "normal completion" and returns the IC card to the command waiting state (ST80).

Note that the predetermined RAM area described above is divided into the collation holding areas A and B.

The control device 11 sets "1" in the corresponding bit in one area in accordance with the value of the eighth bit of key status information in the key EF definition information.

This bit indicates whether the key defined by the key EF definition information is changed. As will be described later, if the bit is "0", the key has been changed; if the bit is "1", the key is not changed.

Furthermore, if the bit is "0", the corresponding bit in the collation holding area A is set; if the bit is "1", the corresponding bit in the collation holding area B is set.

On the other hand, if the two key data disagree (ST77), the control device 11 looks up the collation bit designation information and status information in the key EF definition information and sets "0" in a predetermined bit in the collation holding area A or B following the same procedure as above (ST81).

Next, the control device 11 increments the collation mismatch counter unique to the key by 1 (ST82).

If the maximum count value in the key EF definition information is not reached (ST83), the control device 11 outputs a response message indicating "collation mismatch" and returns the IC card 1 to the command waiting state (ST84).

If the maximum value is reached, the control device 11 outputs a response message indicating "key is locked" and returns the IC card 1 to the command waiting state (ST85).

The collation holding area A is looked up when a file, key EF, and key data are created and when key data is changed. The collation holding area B is looked up when key data is changed.

As described above, a bit in the collation holding area A is turned on if a key is already changed, and a bit in the collation holding area B is turned on if a key is not changed. Therefore, a key must be already changed when a file, key EF, and key data are created.

Also, when a key is to be changed, the collation holding areas A and B are looked up. Hence, a key can be changed regardless of whether this key is already changed or not changed.

Figure 13:
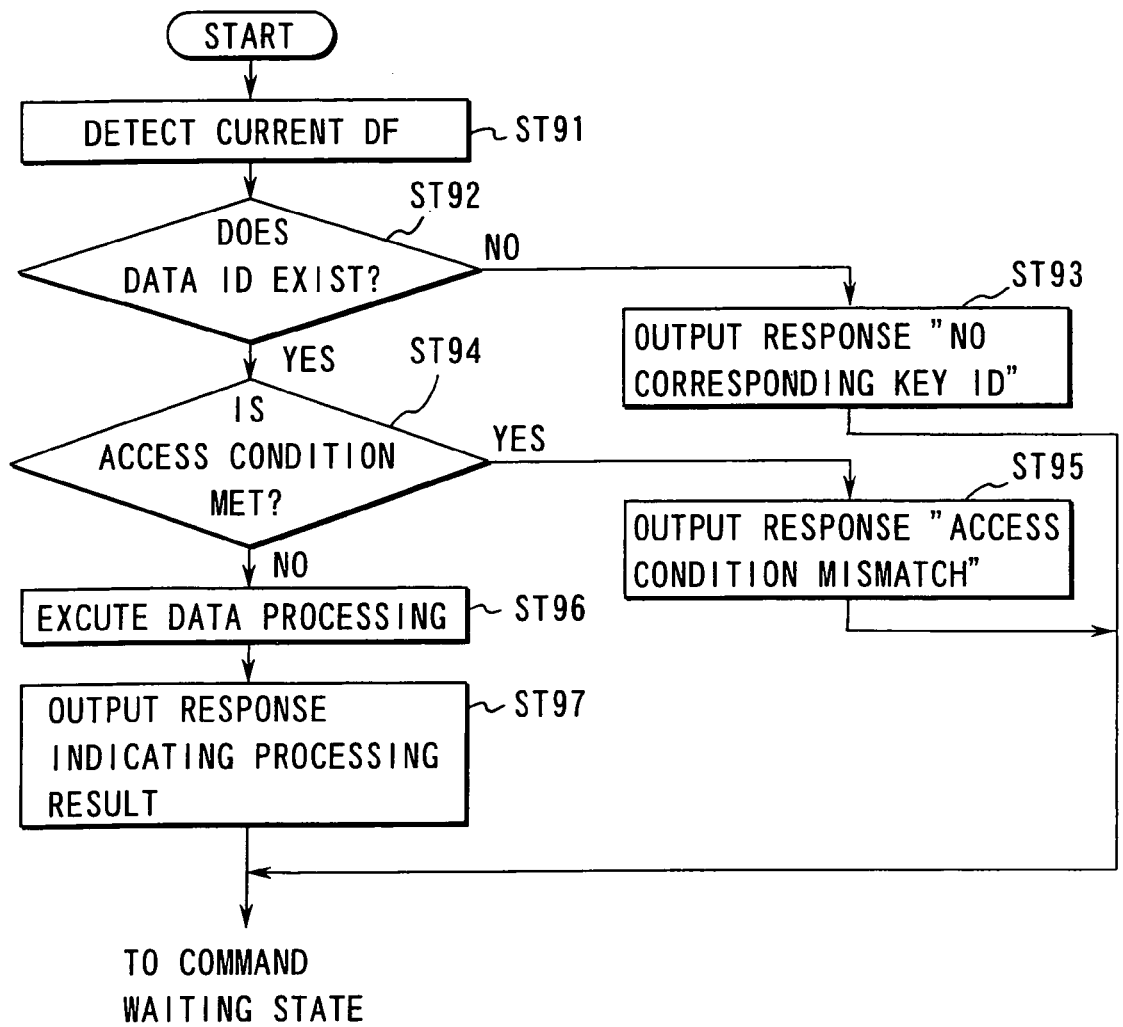
FIG. 13 is a flow chart for explaining an operation of accessing a data elementary file.

FIG. 13 is a flow chart for explaining an operation of accessing a data EF. This operation will be described below.

When the IC card 1 receives an externally input data EF access command, the control device 1 detects a current DF (ST91).

After detecting the current DF, the control device 11 looks up an elementary file name (EF-ID) designated by the command message and checks whether this elementary file name exists in the current DF to be accessed (ST92).

If this EF does not exist, the control device 11 outputs a response message indicating "no corresponding key ID" and returns the IC card 1 to the command waiting state (ST93).

If the EF exists, the control device 11 looks up access condition information corresponding to the type (data read/write/change) of access as one access condition information in this data EF definition information.

The control device 11 compares this access condition information with the collation holding area A on the RAM (to be described later) and checks whether key collation required by the access condition is established (ST94).

If this collation is not established, the control device 11 outputs a response message indicating "access condition mismatch" and returns the IC card 1 to the command waiting state (ST95).

If the collation is established, the control device 11 accesses a corresponding data EF area (ST96). The control device 11 then outputs a response message indicating the processing result and returns the IC card 1 to the waiting state (ST97).

A procedure of creating files for an IC card in the above arrangement will be described below.

To set (create) an elementary file of a transport key to be transferred to a card issuer when an IC card is manufactured, "key-EF-a" is created under a master file (MF) as shown in FIG. 14 in accordance with the flow chart in FIG. 9. The transport key is set in this "key-EF-a".

Subsequently, data is set in the key elementary file EF-a in accordance with the flow chart in FIG. 10. In setting the key, a key setting access condition given to this key-EF-a is looked up.

When the issuer receives the card in this state, the issuer changes the transport key in accordance with the flow chart in FIG. 11.

That is, as shown in FIG. 15, the issuer changes the transport key set by the manufacturer to a key (a') that only the issuer can know.

This change is done by looking up a key changing access condition set in this key EF.

At this point, a transport bit given to the master file (MF) is turned on, and creation of any key under this master file (MF) by the manufacturer is rejected after that.

Next, the issuer creates data EF-a necessary for the issuer under the master file (MF).

This creation is accomplished by looking up an EF creating access condition set in the master file (MF).

The issuer also creates a data file (DF) to be released to an application provider under the master file (MF).

The DF is set in accordance with the flow chart in FIG. 7 by looking up a data file (DF) creating access condition set in the master file (MF).

Next, the issuer creates a transport key EF-b to be transferred to the application provider under the data file (DF).

This transport key EF-b is created in accordance with the flow chart in FIG. 9 by looking up not an access condition given to the data file (DF) but an access condition given to the master file (MF) as a parent file of this data file (DF).

The issuer then sets a transport key in this transport key EF-b.

This transport key is set in accordance with the flow chart in FIG. 10 by looking up a key setting access condition set in the key EF-b.

When the application provider receives the card in this state, this application provider changes the transport key set by the issuer to a key (b') that only the provider can know.

This change is done by looking up a key changing access condition set in the key EF.

At this point, a transport bit given to the data file (DF) is turned on, and creation of any key under the data file (DF) by the issuer is rejected after that.

Subsequently, the application provider creates data EF-b necessary for the provider under the data file (DF).

This data EF-b is created in accordance with the flow chart in FIG. 7 by looking up an EF creating access condition set in the data file (DF).

The application provider also creates a key EF-c necessary for the provider under the data file (DF).

This key EF-c is created in accordance with the flow chart in FIG. 8 by looking up the EF creating access condition set in the data file (DF).

Commands are as follows. In particular, a common key EF creation command and a transport key EF creation command have different command code forms. The IC card identifies the contents of a command in accordance with this command code.

That is, the control device 11 discriminates between a common key EF creation command and a transport key EF creation command, processes a transport key EF creation command in accordance with the flow chart in FIG. 9, and processes a common key EF creation command in accordance with the flow chart in FIG. 8.

Area (elementary file) creation command command code A/AID(EF-ID)/ASIZ/AAC

Key EF creation command command code B/KID/KSIZ/CF/AAC

Transport key EF creation command command code C/KID/KSIZ/CF/AAC

A transport key EF is created under the current DF described above by looking up the access condition of a parent DF of this current DF.

Since an upper party sets the access condition of the parent DF, this upper party can create the transport key EF.

Also, a transport key is set in the transport key EF by looking up the access condition of this EF, and this access condition of the EF is set by the upper party when the transport key EF is created. Therefore, the upper party sets the access condition of the EF such that the transport key can be set in the transport key EF.

When an application provider is to set a key EF under the current DF, a key EF creating access condition of the current DF is looked up. The access condition of the DF is set by the upper party when the DF is created.

After the transport key is changed, however, only the application provider can perform processing (creation of a data EF and key EF) using this DF access condition. Accordingly, the access rights can be clearly distinguished.

Furthermore, the upper party sets a key after the transport key is changed as a key EF creating access condition. The application provider sets a key EF to be used by the provider after changing the transport key and also prepares an environment meeting the access condition of the DF in accordance with collation bit designating information in key definition information in this key EF. When the application provider collates the key, the DF access condition for creating a data EF is met, so the data EF can be created.

In this manner, the upper party sets the DF access condition but has nothing to do with the contents of the access condition. This allows only the application provider to satisfy the DF access condition.

In this embodiment as described above, a key necessary to create an EF (or DF) under a data file (DF) is determined by an access condition given to the data file (DF). Also, this access condition can be realized without designating an upper key (in this embodiment, the issuer is an upper party of the application provider).

Accordingly, a file (or memory area) that the application provider wants to manage can be protected only by the provider's own key.

This prevents the issuer from involving with this data file (DF). That is, the right to access this file (or memory area) is transferred from the issuer to the application provider.

In this embodiment, a transport bit is OFF when a data file (DF) is created and turned on when the transport key is changed by a key change command. However, this transport bit can also by turned on by a command for turning on the transport bit independently of the key change command.

If this is the case, this command is executed by looking up an access condition set in the file to be accessed.

As described above, upon receiving a command message, the IC card 1 performs corresponding processing and transmits the result to an external apparatus. The IC card 1 executes command processing at any time by this basic operation.

That is, when receiving a command message the IC card 1 extracts a function code contained in the message and checks which function is required.

As described above, DFs and EFs of the IC card have a hierarchical structure. After a DF and an EF are designated and selected in accordance with external commands, processes of, e.g., setting and writing data are performed.

The IC card of the present invention has a function of accessing a memory area by externally directly designating a data element, in addition to the function of accessing a memory area by designating and selecting a DF and an EF.

The processing function of a PUT command for accessing a memory area by externally directly designating a data element will be described below with reference to FIGS. 17 to 19.

Figure 19:
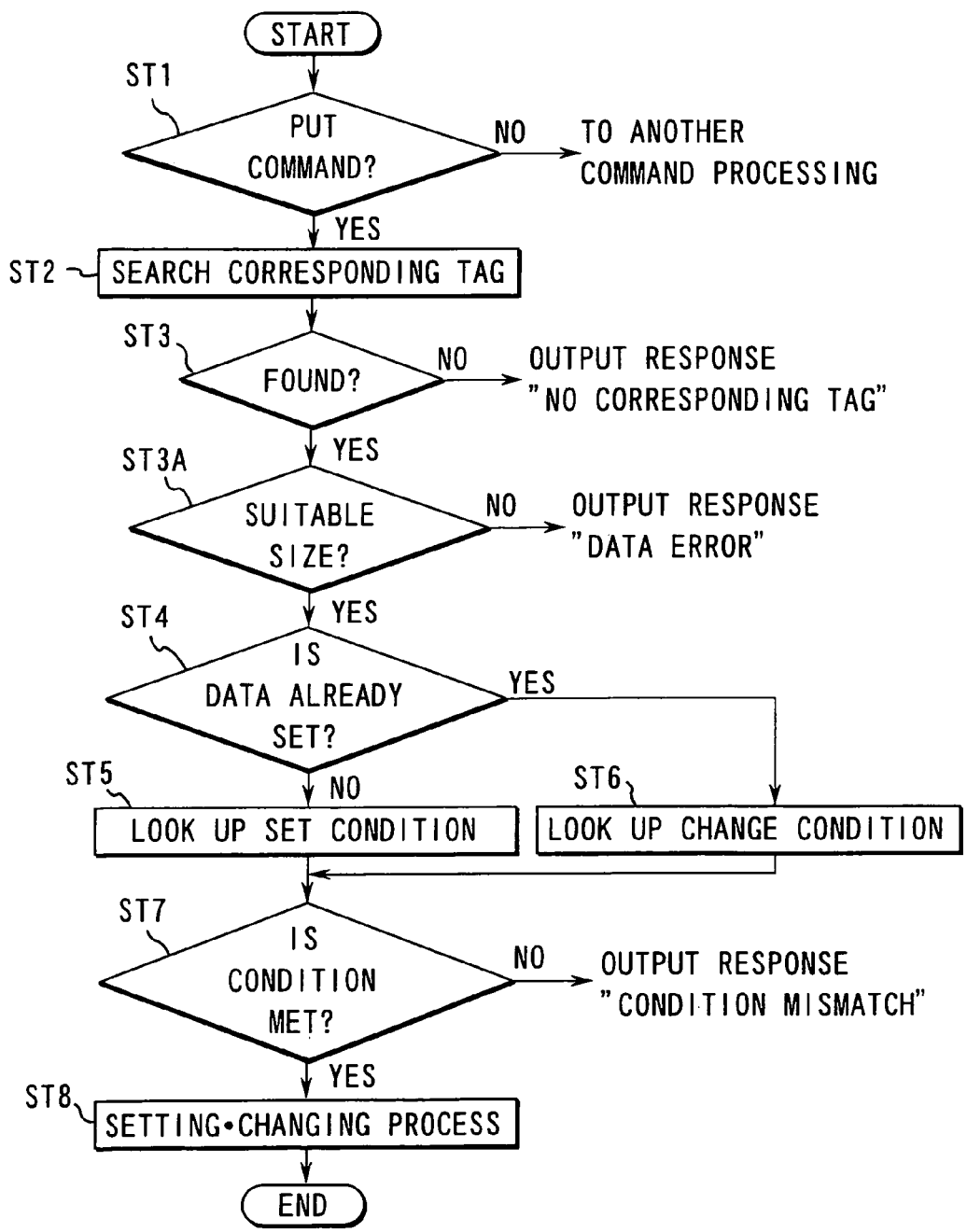
FIG. 19 is a flow chart for explaining a PUT command processing flow as a practical example of the features of the present invention.

FIG. 19 shows the processing flow of the PUT command as a practical example of the features of the present invention.

Figure 18:
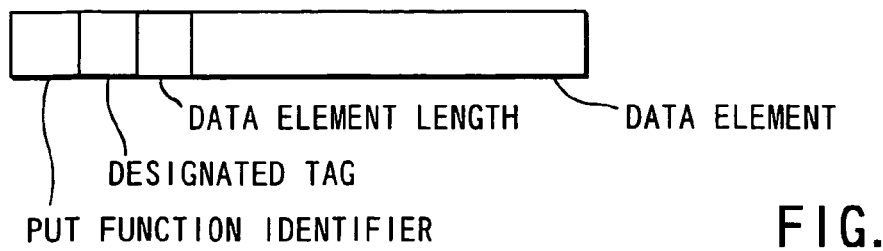
FIG. 18 is a view showing the contents of a PUT command message used to process the PUT command.

FIG. 18 shows the contents of a PUT command message used in this PUT command processing.

That is, to access a memory area by directly designating a data element, an external apparatus transmits a PUT command message in the form shown in FIG. 18 to the IC card 1.

This PUT command message includes a function identifier indicating that this command is a PUT command, a designation tag, a data element length, and a data element.

FIG. 17 shows a data element control table used in this PUT command processing.

This data element control table is stored in the internal data memory 12 of the IC card 1 and contains "location" information, "size" information, "read condition" information, "write condition" information, and "rewrite condition" information of data elements related by tags.

The location information is composed of the ID and EF address of an EF in which a corresponding data element is stored.

Each access condition is a combination of index information of corresponding password information. For example, to read out a data element of tag 01, password information A, B, or C must be collated.

P indicates access inhibition (access is inhibited even after any password information is collated). F indicates access free (access is permitted without collating any password information).

For example, an accessing party knowing the password information A collates this password information and can (1) read out and write a data element having tag 01, (2) read out and write a data element having tag 02, and (3) write a data element having tag 03.

An accessing party knowing the password information B collates this password information and can (1) read out, write, and rewrite the data element having tag 01.

An accessing party knowing the password information C collates this password information and can (1) read out the data element having tag 01, (2) read out the data element having tag 02, and (3) write and rewrite the data element having tag 03.

Note that the data element having tag 02 cannot be rewritten by any accessing party.

Note also that the data element having tag 03 can be read out by any accessing party without collating password information.

More specifically, in the processing flow as shown in FIG. 19, the IC card 1 having the aforementioned basic arrangement receives the PUT command message as shown in FIG. 18. The control device 11 identifies the function identifier of the command to check whether this command message is the PUT command message (step S1). If not, the flow advances to another command checking process.

If the control device 11 determines in step S1 that the received command is the PUT command, the control device 11 checks whether a tag designated by the command exists by looking up the data element control table shown in FIG. 17, in order to check the presence/absence of a data element whose write or rewrite is designated (step S2).

If the designated tag is not found, the control device 11 outputs a status code indicating "no corresponding tag", and the flow advances to the command waiting state (step S3).

If the designated tag is found, the control device 11 compares length information corresponding to the given tag with the length of the data element given by the command message.

That is, the control device 11 looks up "variable/fixed" information defined together with the length information. If "variable" is set, the value of the defined data length is the maximum allowable value. If "fixed" is set, the value of the defined data length alone is an allowable value.

If the given data element does not have an allowable data length, the control device 11 outputs a status code indicating "data length error", and the flow advances to the command waiting state (step S3A).

That is, when the data element corresponding to the designated tag has fixed length information or variable length information, "data length error" is output if the length of the received data element is not equal to the fixed length information or larger than the variable length information.

If the given data element has an allowable data length, the control device 11 detects a corresponding memory area and checks whether a data element exists in this area (step S4).

If a data element exists, the control device 11 looks up an access condition pertaining to rewrite of this data element (step S5). If no data element exists, the control device 11 looks up an access condition pertaining to write of the received data element (step S6).

In step S7, the control device 11 checks whether password collation meeting the looked-up access condition is established. If no such collation is established, the control device 11 outputs a status code indicating "access condition mismatch", and the flow advances to the command waiting state.

If not, the control device 11 writes the data element given by the command in the memory area and outputs the result of this write process, and the flow advances to the command waiting state (step S8).

Accordingly, the features of the present invention as described above achieve the following effects.

(1) When a command having a plurality of functions is received, whether access of this command is to be permitted is determined by selecting an access condition to be looked up in accordance with the storage state of a memory area (or data element) to be accessed.

(2) An allowable length for changing/setting a data element can be set for each data element. Additionally, this allowable length can be either a unique length or the maximum allowable length.

In the above embodiment, an IC card is taken as an example of an electronic device for performing memory access management. However, the present invention is similarly applicable to any portable electronic device including a memory which requires memory access management.

According to the present invention as has been described in detail above, it is possible to provide an access management method and apparatus by which when a command having both setting and changing functions is input, the presence/absence of a data element to be accessed is checked, and whether access of the command is to be permitted is determined by looking up a setting access condition if the data element is not set and looking up a changing access condition if the data element is set, thereby preventing the setting and changing access conditions from becoming the same, and to provide a portable electronic device for use in the method and apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An access management method of receiving a same command message having both setting and changing functions, performing corresponding processing, and transmitting the result to an external apparatus, comprising:
   receiving in the same command message having both setting and changing functions, information including a length for a data element; determining whether the length of the data element is a suitable size, including:
      implementing a memory storing a table containing identification information, location information, allowable length information, and discrimination information, which discriminates whether the allowable length information is fixed length information or a maximum length, of each of a plurality of data elements;
      implementing size determining means for, when receiving a same command having a plurality of functions and including identification information and setting data of a data element from an external apparatus, looking up allowable length information of the data element and discrimination information for discriminating whether the allowable length information is fixed length information or a maximum length, and determining whether a length of the received data element equals the fixed length information if the allowable length information is the fixed length information or determining whether the length of the received data element is not more than the maximum length if the allowable length information is the maximum length; and
      implementing means for setting the data if said size determining means determines that a size of the received data is a suitable size; and
   checking the presence/absence of the data element to be accessed when receiving the same command message having both said setting and changing functions to reflect that the length of the data element is a suitable size.

2. A method according to claim 1, further comprising:
   receiving a command having a plurality of functions and determining whether access is to be permitted by selecting an access condition to be looked up in accordance with a storage state of a memory area to be accessed.

3. A method according to claim 1, further comprising:
   receiving a command having a plurality of functions and determining whether access is to be permitted by selecting an access condition to be looked up in accordance with a storage state of a data element to be accessed.

4. A method according to claim 1, further comprising:
   receiving a command having a plurality of functions and determining whether access is to be permitted by selecting an access condition to be looked up in accordance with a storage state of a data element to be accessed; and
   setting an allowable length for each data element for changing/setting each data element.

5. A method according to claim 1, further comprising:
   receiving a command having a plurality of functions and determining whether access is to be permitted by selecting an access condition to be looked up in accordance with a storage state of a data element to be accessed;
   setting an allowable length for each data element for changing/setting each data element; and
   setting a unique length or the maximum allowable length.

6. An access management apparatus configured to receive in a same command message having both setting and changing functions, information including a length for a data element, perform corresponding processing, and transmit the result to an external apparatus, comprising:
   a control device configured to determine whether the length of the data element is a suitable size, including:
      implementing a memory storing a table containing identification information, location information, allowable length information, and discrimination information, which discriminates whether the allowable length information is fixed length information or a maximum length, of each of a plurality of data elements;
      implementing size determining means for, when receiving a same command having a plurality of functions and including identification information and setting data of a data element from an external apparatus, looking up allowable length information of the data element and discrimination information for discriminating whether the allowable length information is fixed length information or a maximum length, and determining whether a length of the received data element equals the fixed length information if the allowable length information is the fixed length information or determining whether the length of the received data element is not more than the maximum length if the allowable length information is the maximum length; and
      implementing means for setting the data if said size determining means determines that a size of the received data is a suitable size; and
   checking means for checking the presence/absence of the data element to be accessed when receiving the same command message having both said setting and changing functions to reflect the length of the data element is a suitable size.

7. An apparatus according to claim 6, further comprising:
   means for receiving a command having a plurality of functions and determining whether access is to be permitted by selecting an access condition to be looked up in accordance with a storage state of a memory area to be accessed.

8. An apparatus according to claim 6, further comprising:
   means for receiving a command having a plurality of functions and determining whether access is to be permitted by selecting an access condition to be looked up in accordance with a storage state of a data element to be accessed.

9. An apparatus according to claim 6, further comprising:
   means for receiving a command having a plurality of functions and determining whether access is to be permitted by selecting an access condition to be looked up in accordance with a storage state of a data element to be accessed; and
   means for setting an allowable length for each data element for changing/setting each data element.

10. An apparatus according to claim 6, further comprising:
    means for receiving a command having a plurality of functions and determining whether access is to be permitted by selecting an access condition to be looked up in accordance with a storage state of a data element to be accessed;

means for setting an allowable length for each data element for changing/setting each data element; and means for setting a unique length or the maximum allowable length.

11. A portable electronic device for receiving a same command having a plurality of functions from an external apparatus, and performing corresponding processing, comprising:

a memory storing a control table containing identification information, location information, a data setting access condition, and a data changing access condition of each of a plurality of data elements;

a length for a data element included in the same command having both setting and changing functions; a module for determining whether the length of the data element is a suitable size, including:

implementing a memory storing a table containing identification information, location information, allowable length information, and discrimination information, which discriminates whether the allowable length information is fixed length information or a maximum length, of each of a plurality of data elements;

implementing size determining means for, when receiving a same command having a plurality of functions and including identification information and setting data of a data element from an external apparatus, looking up allowable length information of the data element and discrimination information for discriminating whether the allowable length information is fixed length information or a maximum length, and determining whether a length of the received data element equals the fixed length information if the allowable length information is the fixed length information or determining whether the length of the received data element is not more than the maximum length if the allowable length information is the maximum length; and implementing means for setting the data if said size determining means determines that a size of the received data is a suitable size; and determining means for determining, when receiving a same command having a plurality of functions and including identification information of a data element from an external apparatus, whether the designated data element is present by looking up location information of the data element in the control table; and first look-up means for looking up a data setting access condition in the control table if said determining means determines that the data element is absent;

second look-up means for looking up a data changing access condition in the control table if said determining means determines that the data element is present; and means for setting or changing data in accordance with the access condition looked up by said first or second look-up means, when receiving the same command message having both said setting and changing functions to reflect the length of the data element is a suitable size.

* * * * *

UNITED STATES PATENT AND TRADEMARK OFFICE
CERTIFICATE OF CORRECTION

| | | |
|---|---|---|
| PATENT NO. | : 7,296,289 B2 | Page 1 of 1 |
| APPLICATION NO. | : 10/833174 | |
| DATED | : November 13, 2007 | |
| INVENTOR(S) | : Iijima | |

It is certified that error appears in the above-identified patent and that said Letters Patent is hereby corrected as shown below:

Title Page Should read

(30) Foreign Application Priority Data

--March 24, 1998     (JP)    ............................10-075693--

Signed and Sealed this

Fifteenth Day of April, 2008

JON W. DUDAS
*Director of the United States Patent and Trademark Office*